United States Patent
Stanka et al.

(10) Patent No.: US 11,753,938 B2
(45) Date of Patent: Sep. 12, 2023

(54) METHOD FOR SEALING AN ANNULAR GAP IN A TURBINE, AND TURBINE

(71) Applicant: Siemens Energy Global GmbH & Co. KG, Munich (DE)

(72) Inventors: Ulrich Stanka, Essen (DE); Wolfgang Braukmann, Essen (DE)

(73) Assignee: SIEMENS ENERGY GLOBAL GMBH & CO. KG

(*) Notice: Subject to any disclaimer, the term of this patent is extended or adjusted under 35 U.S.C. 154(b) by 798 days.

(21) Appl. No.: 16/499,488

(22) PCT Filed: Mar. 12, 2018

(86) PCT No.: PCT/EP2018/056006
§ 371 (c)(1),
(2) Date: Sep. 30, 2019

(87) PCT Pub. No.: WO2018/184788
PCT Pub. Date: Oct. 11, 2018

(65) Prior Publication Data
US 2020/0040733 A1     Feb. 6, 2020

(30) Foreign Application Priority Data
Apr. 5, 2017   (DE) .................... 10 2017 205 794.7

(51) Int. Cl.
*F01D 5/00*     (2006.01)
*F01D 5/20*     (2006.01)
(Continued)

(52) U.S. Cl.
CPC ............. *F01D 5/005* (2013.01); *F01D 5/20* (2013.01); *F01D 11/02* (2013.01); *F01D 11/08* (2013.01);
(Continued)

(58) Field of Classification Search
CPC ...... F01D 5/225; F01D 25/243; F01D 25/246; F01D 11/02; F01D 11/08; F01D 5/005;
(Continued)

(56) References Cited

U.S. PATENT DOCUMENTS

| | | | |
|---|---|---|---|
| 4,816,213 A | 3/1989 | Groenendaal, Jr. | |
| 5,501,573 A | 3/1996 | Sanders | |

(Continued)

FOREIGN PATENT DOCUMENTS

| | | |
|---|---|---|
| EP | 2853685 A1 | 4/2015 |
| EP | 2857639 A1 | 4/2015 |

(Continued)

OTHER PUBLICATIONS

Non-English European Search Report for Application No. 18714151.0, dated Dec. 3, 2020.

(Continued)

*Primary Examiner* — Moshe Wilensky
(74) *Attorney, Agent, or Firm* — Schmeiser, Olsen & Watts LLP (57) ABSTRACT

Provided is a method for sealing an annular gap in a turbine with a housing and a rotor, in which method a) an annular recess, which is arranged coaxially with respect to the rotor and opposite the tips of the rotor blades of a stage, is provided in the housing or in at least one element attached to the housing, b) a subdivided insert ring, which is formed such that it can be inserted into the recess in a form-fitting manner with play, is provided, c) the insert ring is inserted into the recess, more particularly in that the insert ring is pushed into the recess at least substantially in the axial direction, and d) the insert ring is fixed using securing elements in such a way that an at least substantially axially directed clamping force is applied by means of the securing elements. A turbine is also provided.

20 Claims, 5 Drawing Sheets

(51) Int. Cl.
*F01D 11/02* (2006.01)
*F01D 11/08* (2006.01)
*F01D 25/24* (2006.01)

(52) U.S. Cl.
CPC ........ *F01D 25/246* (2013.01); *F05D 2220/31* (2013.01); *F05D 2230/60* (2013.01); *F05D 2230/80* (2013.01); *F05D 2240/55* (2013.01); *F05D 2260/31* (2013.01)

(58) Field of Classification Search
CPC ... F01D 5/20; F16J 15/4472; F05D 2250/181; F05D 2250/231; F05D 2250/182; F05D 2250/294; F05D 2230/10; F05D 2230/60; F05D 2230/80; F05D 2220/31; F05D 2240/55; F05D 2260/31
See application file for complete search history.

(56) References Cited

U.S. PATENT DOCUMENTS

| | | |
|---|---|---|
| 5,632,598 A | 5/1997 | Maier |
| 2007/0258826 A1 | 11/2007 | Bracken et al. |
| 2008/0175706 A1 | 7/2008 | Ikeda et al. |
| 2016/0201497 A1 | 7/2016 | Ahmad et al. |

FOREIGN PATENT DOCUMENTS

| | | |
|---|---|---|
| EP | 2873812 A1 | 5/2015 |
| GB | 767656 A | 2/1957 |
| JP | S47502 U | 8/1972 |
| KR | 20070108065 A | 11/2007 |

OTHER PUBLICATIONS

Korean Office Action for Application No. 1020197032289, dated Nov. 2, 2020.
PCT International Search Report and Written Opinion of International Searching Authority dated Jul. 6, 2018 corresponding to PCT International Application No. PCT/EP2017/065493 filed Mar. 12, 2018.
DE Search Report for Application No. 10 2017 205 794.7, dated Feb. 5, 2018.

FIG 1

PRIOR ART

FIG 2

PRIOR ART

METHOD FOR SEALING AN ANNULAR GAP IN A TURBINE, AND TURBINE

CROSS-REFERENCE TO RELATED APPLICATIONS

This application claims priority to PCT Application No. PCT/EP2018/056006, having a filing date of Mar. 12, 2018, which is based off of DE Application No. 10 2017 205 794.7, having a filing date of Apr. 5, 2017, the entire contents both of which are hereby incorporated by reference.

FIELD OF TECHNOLOGY

The following relates to a method for sealing an annular gap in a turbine having a casing and a rotor which is arranged in the casing, is mounted so that it can rotate about its central longitudinal axis and is equipped with a plurality of rotor blade stages. Embodiments of the invention furthermore relates to a turbine.

BACKGROUND

In order to obtain the highest possible efficiency in turbines, for example steam turbines, it is necessary to reduce losses as much as possible. Losses can occur in the region of the flow channel, inter alia in those annular gaps which are in each case formed between the tips of the blades of a rotor blade stage of the rotor and that wall region of the flow channel which is situated radially opposite said tips. These annular gaps are sealed, for example, by means of non-contact labyrinth or tip-to-tip seals which comprise fins protruding radially outward from the tips of the rotor blades and sealing strips protruding radially inward from the opposite wall regions. Flow through the annular channels is prevented or at least reduced by the arrangement of fins and sealing strips.

It is known that, to fasten sealing strips, sealing grooves which extend circumferentially are provided in the wall regions situated opposite the rotor blade tips, into which sealing grooves in each case an end region, bent into an L-shape, of a (likewise circumferential) sealing strip is inserted and fixed by means of a caulking wire.

In particular when steel that is not resistant to erosion and corrosion is used in the blade path, in conjunction with a high level of steam moisture, sealing regions of the rotor blades and guide vanes can be eroded and in particular the sealing strips fastened by means of caulking wires can become detached from the sealing strip grooves. In this case, it is difficult to restore the original sealing of the annular passages in particular because it is generally not possible for new strips to be laid in eroded sealing strip grooves owing to missing material.

SUMMARY

Against this background, an aspect relates to provide a method for sealing an annular gap in a turbine which can be performed with relatively little effort, ensures good sealing of the annular gap and hence a high degree of efficiency of the turbine, and is also suitable for restoring the sealing in the case of damage in the region of annular gaps.

This aspect is achieved by a method for sealing an annular gap in a turbine having a casing and a rotor which is arranged in the casing, is mounted so that it can rotate about its central longitudinal axis, and is equipped with a plurality of stages of rotor blades, in which:

a) an annular depression, coaxial with the rotor and situated opposite the tips of the rotor blades of a stage, is provided in the casing or in at least one element fastened to the casing, b) an in particular split insert ring is provided which is designed such that it can be inserted positively into the depression with play, c) the insert ring is inserted into the depression in particular by the insert ring being pushed into the depression in an at least essentially axial direction, and d) the insert ring is fixed with fastening elements in such a way that an at least essentially axially directed tensile force is applied by means of the fastening elements.

The method according to embodiments of the invention is performed, in an exemplary embodiment, for repairing a turbine which has at least one damaged sealing region. Then, in step a) the depression in the casing or at least an element fastened directly or indirectly to the casing is produced using a material-removing method. The depression produced extends over a region on the casing or at least an element, fastened directly or indirectly thereon, on which damage was present prior to the removal of material. The damage can be present, for example, in the form of eroded sealing strip grooves from which the sealing strips have been detached, and the sealing strip grooves are in particular completely removed as part of the production of the depression.

In a further particularly advantageous embodiment of the method according to embodiments of the invention, an insert ring is provided which has, on its inner cylindrical surface facing the rotor blade tips in the assembled state, a plurality of sealing strips which project in particular radially from the insert ring and/or extend in the circumferential direction of the insert ring. Sealing strip grooves, extending in the circumferential direction and in which in each case a circumferential sealing strip is fixed for example by means of a caulking wire, are then provided in the insert ring for fastening the sealing strips.

According to embodiments of the invention, in order to seal the annular gap of a rotor blade stage, an insert ring is used which is arranged opposite the blade tips of a rotor blade stage and forms their friction partner during operation. The insert ring provided may be manufactured from a material resistant to erosion and corrosion, for example X3CrNiMo13-4. The insert ring is arranged and fixed in a provided or generated annular depression, wherein according to embodiments of the invention fastening elements are used for fixing purposes, by means of which the insert ring is tensioned axially against the casing or the at least one element fastened to the casing. The insert ring may be inserted into the depression by being pushed therein in at least an essentially axial direction. A depression is accordingly provided which allows the insert ring to be pushed axially into the proper position in the depression, in particular does not have any undercuts which prevent this. Such a depression is characterized by a simple turning contour and can hence be produced with relatively little effort. In the case of repairs, the insert ring replaces previously removed damaged material and the original efficient sealing action can be fully restored. The insert ring and/or depression can in particular be rotationally symmetrical.

By virtue of sealing surfaces which bear against each other in a defined fashion, the axial fixing according to embodiments of the invention reliably prevents penetration over the contour situated behind the insert ring which in particular is not made from material which is resistant to erosion and corrosion. Compared with other fastening options for the insert ring, for example radial screw-fastening and/or fastening via dovetail- or T-shaped fastening grooves, the procedure according to embodiments of the invention moreover has the considerable advantage that there is no need for any interruptions to be present in the inner cylindrical surface, facing the rotor blade tips, for fastening elements, and the segmentation of the insert ring can be limited to a minimal number, in particular to just two annular segments, corresponding to a turbine casing with an upper and lower half. As a result, leakages or penetration are also consequently reliably prevented.

The insertion of the in particular two-part ring into the depression in the axial direction is moreover less complex than, for example, pushing a plurality of annular segments in the circumferential direction into approximately T- or dovetail-shaped fastening grooves. The risk of wedging or seizing up associated with such pushing-in is reliably prevented.

Because in the in particular only two insert ring segments, in each case there are no interruptions present in the inner cylindrical surface, the whole surface is moreover available for fastening sealing strips, for example by means of sealing strip grooves provided for this purpose. In the case of a repair, in particular refurbishment of rotor blade seals damaged by erosion or corrosion, the number of sealing strips which were originally present can be provided again.

A further advantage of the procedure according to embodiments of the invention consists in the axially oriented fastening elements being situated, in a protected manner, outside the surface over which the flow moves directly, as a result of which particularly reliable fixing of the insert ring is ensured. Because more favorable space conditions exist outside the region over which the flow moves directly, screw locking means can moreover be provided.

For repair to a turbine, an insert ring is expediently provided which is designed in such a way that it at least partially restores the original geometry of the casing or the at least one element fastened to the casing when it is inserted into the depression.

As an alternative to a repair, the method can of course also be used for the manufacture of a turbine. Then, according to embodiments of the invention, as part of the production of the turbine, an insert ring is provided opposite the tips of the blades of at least one rotor blade stage of the turbine. It can be replaced particularly easily in the event of subsequent damage. Furthermore, implementing the method according to embodiments of the invention at the production stage offers the advantage of cost savings, in particular when erosion resistance is required because although a material with a corresponding high value can be used specifically for the insert ring, the high-value material can be dispensed with in the region of other components, for example in the region behind the insert ring.

Depending on the structure of the turbine, the depression for the insert ring is situated, for example, directly in the turbine casing. If, rather than part of the casing itself being situated opposite the tips of the rotor blades, one or more elements which are fastened to the casing is/are instead, the depression is provided according to embodiments of the invention in this/these one or more elements. The at least one element fastened directly or indirectly to the casing can, for example, be a single- or multi-part guide vane ring on which all the guide vanes of at least one guide vane stage of the turbine may be fastened.

In an exemplary embodiment, the depression is provided in a region of the casing or at least one element fastened thereto, in which there is a step-like change in the internal diameter of the casing or at least one element. In this case, a form can be obtained easily which permits axial insertion of the insert ring into the depression because a depression is open on at least one side at the location of a step in the axial direction.

The turbine casing generally comprises an upper and a lower half and the insert ring may be divided in a fashion corresponding to the division of the casing, in particular for assembly purposes. Accordingly, the insert ring is split into precisely two parts which may be of the same size, in particular forming precisely one split joint. There is generally no need for further splitting of the insert ring as part of the method according embodiments of to the invention, although this is possible. It is, however, expedient to minimize the number of insert ring segments in order to prevent interruptions and the risk of penetration associated therewith.

The fastening elements which may have an elongated design are, for example, screws and/or threaded rods and/or bolts. The elongated fastening elements may be inserted at least essentially axially into the insert ring, in particular into at least essentially axially oriented through bores in the insert ring and accordingly extend through them in the assembled state.

In a further embodiment of the method according to embodiments of the invention, it is accordingly provided that an insert ring is provided in which a plurality of at least essentially axially oriented through bores, spaced apart circumferentially, are provided for each elongated fastening element, and a plurality of at least essentially axially oriented threaded bores are provided in particular in the casing or at least one element fastened to the casing which are arranged in such a way that they are aligned with the through bores in the insert ring when the insert ring is inserted properly into the depression. The threaded bores are manufactured in particular after the depression has been produced. Moreover, they advantageously open into the region of the depression. The through bores in the insert ring are designed as counterbores. If screws are used as fastening elements, then their heads too are accommodated by the through bores in a manner known per se.

In order to ensure a particularly reliable fixing of the insert ring, it can be provided that the locking elements are each locked with a locking means. The locking means may each comprise at least one wedge lock washer. It has proven to be particularly expedient if two wedge lock washers are used which, in those cases where screws are used as elongated fastening elements, are in a manner known per se arranged below the heads of the screws as flat washers.

In a further exemplary embodiment of the method according to embodiments of the invention, an insert ring is provided which has a conical sealing portion which tapers toward an axial end of the insert ring. A depression is then accordingly provided or produced which comprises a receiving portion, the inner contour of which is adapted to the outer contour of the sealing portion of the insert ring, in particular with play. If the insert ring has a conical sealing portion, it is provided in particular with an annular shape and/or at the end of the insert ring. If the sealing portion is annular, it has in particular at least one cylindrical surface which tapers conically toward an axial end of the insert ring. The axial fixing according to embodiments of the invention, in conjunction with a conical seat according to this exemplary embodiment, on the one hand permits a particularly reliable tensioning of the insert ring over its whole length and width. Moreover, a defined, particularly reliable seal is obtained via the inclined surface or inclined surfaces of the conical seat. If the conical sealing portion is pushed, by virtue of the axial tensioning according to embodiments of the invention, axially into the correspondingly shaped, with play, receiving region of the depression, owing to the inclined surface the sealing portion is also pressed radially against a wall of the receiving region and obtains a good seal. As a result, flow behind the insert ring is particularly reliably prevented.

A depression and an insert ring can furthermore be provided which are designed, so that they correspond with each other, in such a way that a predetermined amount of play exists between at least essentially radially oriented stop surfaces of the depression and the insert ring.

The method according to embodiments of the invention is also suitable for large-diameter annular gaps and insert rings with a thin design can also be used. The diameters of the annular gap can be, for example, within the range of 2 to 4 m, in particular 3 to 3.5 m. Insert rings which extend relatively far in the axial direction, i.e. relatively wide insert rings can likewise be used, in particular in the case of fixing by axial tensioning in combination with a conical sealing portion, wherein in this case too reliable fixing is obtained. The width of the insert ring can, for example, be in the range of 80 to 120 cm.

As a development of the method, it can moreover be provided that an insert ring is provided which is designed in such a way that the sealing portion is spaced apart axially with respect to those points at which the tensile force is introduced via the fastening elements. The sealing portion bears against or close to one axial end of the insert ring and those points via which the axial tensile force is introduced on or close to the other opposite axial end. If the insert ring is fixed by means of screws which are inserted into at least essentially axial through bores in the insert ring, which have stop surfaces for the screw heads, the sealing portion and the stop surfaces of the through bores are in particular spaced apart axially from one another and are particularly provided in each case on or close to opposite axial ends of the insert ring.

An insert ring can furthermore be provided which is at least approximately L-shaped in axial section and has an elongated limb which extends at least essentially axially and a shorter limb which extends at least essentially radially. Through bores are then provided in particular in one limb, in the limb which extends at least essentially radially, and extend in particular at least essentially parallel to the other limb. Alternatively, or additionally, a depression which is at least approximately L-shaped in axial section may be provided.

Furthermore, the sealing portion can be formed by the axial end region of the limb which extends at least essentially radially or be integrally formed with the limb, in particular with its outer cylindrical surface, which extends at least essentially radially.

In a development, it can be provided that an insert ring is provided which has a circumferentially extending drainage channel, wherein the drainage channel is in particular arranged in such a way that its open upper side faces outward. In particular, as part of a repair, it is expedient in an insert ring with a drainage channel if a drainage channel which needs to be replaced has been provided beforehand in that region which has been removed to produce the depression.

Lastly, a further embodiment is characterized by an insert ring being provided which has been produced by a single-part insert ring blank being manufactured first and the single-part insert ring blank being split into at least two insert ring parts which are in particular of the same size, forming at least one split joint. This procedure has proved to be particularly expedient. It is then provided that the diameter of the insert ring provided exceeds the diameter of the depression produced by a predetermined value. This has the purpose of compensating the loss of material associated with the subsequent mechanical splitting of the initially closed manufactured insert ring blank. It can be determined and estimated precisely how great the loss of material is as a result of the method which has been used for the splitting and the annular diameter can accordingly be dimensioned to be larger. When inserted into the depression, the insert ring which has a slightly larger diameter is then bent to be slightly smaller so that it can be inserted into the depression, be pushed axially into the latter.

A further subject of embodiments of the invention is a turbine comprising at least one annular gap which is sealed when the method according to embodiments of the invention is performed. The turbine here can be both one where, in the course of it being newly produced, one or more annular gaps has/have been sealed when the method according to embodiments of the invention is performed, and one where the method according to embodiments of the invention has been performed for the purpose of repair, in particular restoring a seal of the one or more annular gaps.

BRIEF DESCRIPTION

Some of the embodiments will be described in detail, with reference to the following figures, wherein like designations denote like members, wherein.

DETAILED DESCRIPTION

Figure 1:
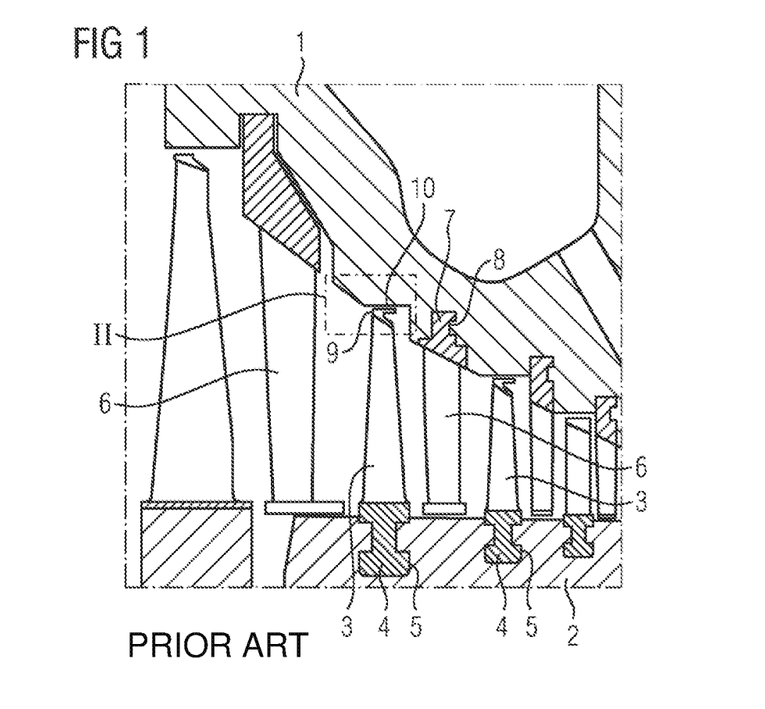
FIG. 1 shows a schematic axial part section through the low-pressure stage of a steam turbine, in which the guide vanes are held directly on the casing.

FIG. 1 shows, in a purely schematic view, an axial part section through the low-pressure stage of a steam turbine. The steam turbine comprises a casing 1 which is usually divided into an upper and lower half, with the formation of a split joint, and in which a rotor 2 which is mounted so that it can rotate about a central longitudinal axis is arranged in a manner known per se. The rotor 2 is equipped with a plurality of axially spaced-apart rotor blade stages, each of which comprises a plurality of rotor blades 3 which are spaced apart equidistantly in the circumferential direction. With the exception of the first rotor blade 3 situated on the far left in FIG. 1, the rotor blade feet 4 are inserted into correspondingly formed fastening grooves 5 in order to fasten the rotor blades 3 on the rotor 2. One guide vane stage of the turbine, which in a similar fashion comprises a plurality of guide vanes 6 spaced apart equidistantly in the circumferential direction, is in each case situated between two adjacent rotor blade stages. Likewise, with the exception of the first guide vane 6, the guide vanes 6 are fastened directly to the casing 1 by their blade feet 7 being pushed into correspondingly designed fastening grooves 8. An annular gap 11 is formed in each case between the tips 9 of the rotor blades 3 of each rotor blade stage and the annular wall portion 10 situated radially opposite the rotor blade tips 9. In order to seal the annular gaps 11 of the rotor blade stages, tip-to-tip seals are used in the case of the steam turbine shown. These comprise fins 12 projecting radially from the rotor blade tips 9, and sealing strips 13 projecting radially inward from the annular wall portions 10. The fins and sealing strips 1 can be seen in FIG. 1 but have been removed from FIG. 2 which shows an enlarged view of an extract from FIG. 1. The fins 12 are integrally formed directly on the rotor blade tips 9 and thus form an integral constituent thereof. The sealing strips 12 are metal strips which are fastened by their ends, bent into an L-shape and pointing upward in FIG. 2, being inserted into sealing strip grooves 14 provided in the casing 1 and being fixed therein by means of caulking wires 15.

Figure 2:
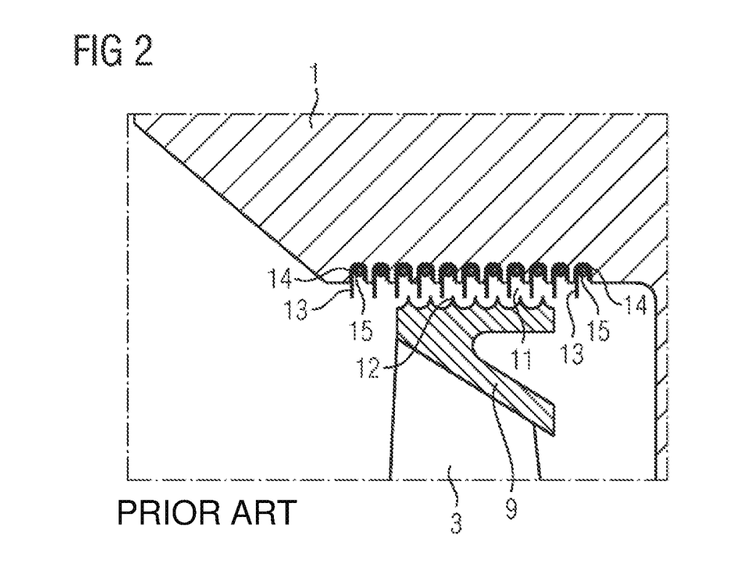
FIG. 2 shows an enlarged view of an extract from FIG. 1.
Figure 3:
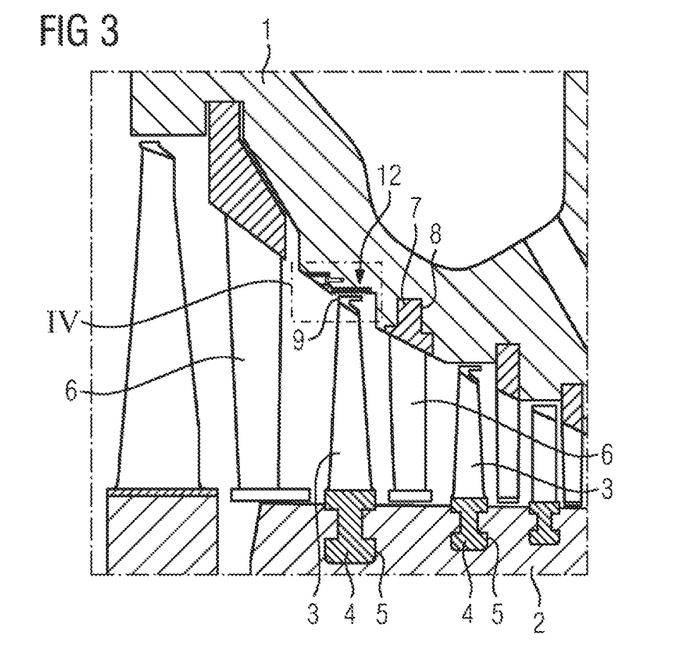
FIG. 3 shows the part section from FIG. 1, an insert ring according to a first embodiment being arranged radially opposite the tips of the first rotor blade stage.

In particular, when steel which is not resistant to erosion and corrosion is used in conjunction with high levels of steam moisture, the sealing strips 13 fastened by the caulking wires 15 can be detached from the sealing strip grooves 14. In this case, it is difficult to restore the original sealing of the annular channels 11 in particular because it is generally not possible for new strips to be laid in eroded sealing strip grooves 14 owing to missing material.

When eroded sealing strip grooves 14 exist, an annular gap can be resealed using the method according to embodiments of the invention. For this purpose, using a material-removal method, an annular depression 16 which is coaxial with the rotor 2 and situated opposite the tips 9 of the rotor blades 3 is first produced in the casing 1, which depression completely encloses that region in which damage (predominantly on the sealing strip grooves 14) exists. As in particular can be seen in FIG. 4, a depression 16 which is approximately L-shaped in axial section is here produced. The depression 16 is produced in that region of the casing 1 in which a step-like change in the internal diameter exists.

According to embodiments of the invention, an insert ring 17 which is likewise approximately L-shaped in axial section and on which sealing strips 13 are fastened is inserted into the depression 16 by being pushed therein in an axial direction. The drawings show the depression 16 with just the insert ring 17 arranged therein. Because the depression 16 has been produced in the region of a step-like change in the internal diameter of the casing 1, it is open on its side facing left in the drawings and the insert ring 17 can be pushed axially from left to right into the depression 16 which has no undercuts preventing such insertion.

The insert ring 17 is manufactured from a material which is resistant to erosion and corrosion, specifically X3CrNiMo13-4 and is not solid in design but instead split in a fashion corresponding to the casing 1, i.e. with the formation of a split joint (not visible in the drawings) in two identically sized annular halves. As part of the production of the insert ring 17, a closed ring blank is first manufactured and is divided into two halves of the same size. Corresponding to this division, an insert ring half can be arranged and fixed in each casing half and, when the casing 1 is closed, a solid insert ring 16 is obtained.

After completion of the depression 16, a plurality of axial threaded bores 18 is provided in the casing 1 which in the present case are arranged on a circle coaxial with the rotor 2 and open into the depression 16. The insert ring 16 is fixed in the depression 17 by means of a plurality of axially oriented screws 19 which are inserted into axial through bores 20 in the insert ring 17, which are spaced apart equidistantly in the circumferential direction and are aligned with the threaded bores 18, and are screwed into the threaded bores 18. The screws 19 are thus arranged and protected outside the region over which there is a direct flow. In the present case, they are moreover each secured against becoming unscrewed by a locking means which are formed by a pair of superposed wedge lock washers 21 which are indicated just in a purely schematic fashion in FIG. 4.

Figure 4:
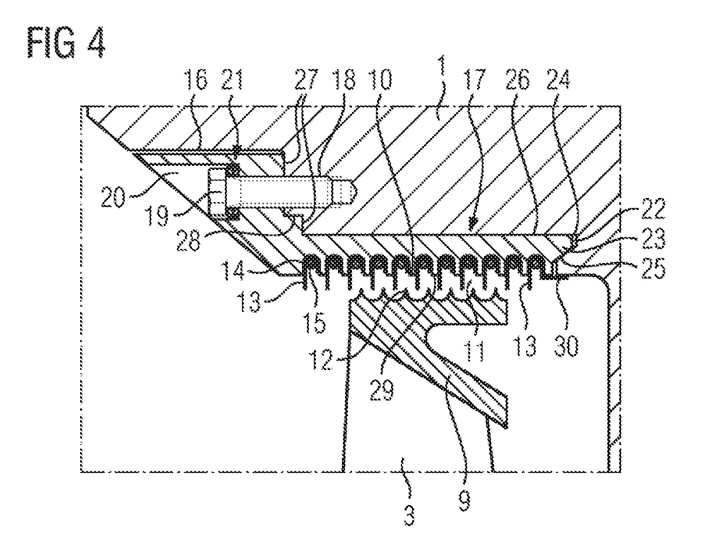
FIG. 4 shows an enlarged view of an extract from FIG. 2.

For particularly good fastening of the insert ring 17 and a particularly leak-tight seat which reliably prevents flow behind the insert ring 17, the insert ring 17 has, at its front side 22 facing right in the drawings, a conical sealing portion 23 which tapers toward the right-hand axial end of the insert ring 17. The depression 16 accordingly has a receiving portion 24, formed in a corresponding fashion with play, which in the present case is formed by the axial end region, situated on the right in the drawings, of the depression 16. As can be seen in FIG. 4, the receiving portion exceeds the dimensions of the conical sealing portion 23 in such a way that its front side 22 cannot come to bear against the front wall of the receiving portion 24.

The axial fixing according to embodiments of the invention, in conjunction with the conical seat, on the one hand allows the insert ring 17 to be tensioned particularly reliably over its whole length and width. Moreover, a defined, particularly reliable sealing effect is achieved by means of the inclined surface of the conical sealing portion 23. If, as a consequence of the axial tensioning by means of the screws 19, the conical sealing portion 23 is pushed into the receiving region 24 of the depression 16, it is also pushed radially, by virtue of the inclined surface, against the upper wall of the receiving region 24 and a particularly good seal is obtained both in the region of the conical sealing surface 25 and the wall portion 26 on the cylindrical surface situated radially opposite. As a result, flow behind the insert ring 17 is prevented particularly reliably.

So that the conical sealing portion 23 can be pushed, as a consequence of the axial tensioning by means of the screws 19, in sealing fashion into the associated receiving portion 24, the contours of the depression 16 and the insert ring 17 are matched to each other in such a way that there is a sufficient amount of defined play available for the remaining left-facing front-side wall portions 27 of the insert ring 17. Where, despite the projecting seal, steam moisture would flow into the region behind the insert ring 17, the rear contour of the insert ring 17 has a step 28 which constitutes an obstacle to the flow.

Because the through bores 20 are provided close to the axial end, to the left in the drawings, of the insert ring 17, and the conical sealing portion 23 forms the opposite right-hand axial end region of the insert ring 17, particularly reliable tensioning of the insert ring 17 over its whole length and width is obtained.

In the exemplary embodiment shown, a total of eleven sealing strips 13 project radially inward from the inner cylindrical surface 23 of the insert ring 17 and are fastened, in exactly the same manner as in the original state of the turbine, in the sealing strip grooves 14 by means of caulking wires 15. The number of sealing strips 13 corresponds to the number present before the repair. The far right sealing strip in the drawings has a bent portion, serving as a protective strip 30, which covers the transition from the insert ring 17 to the depression 16 in order to obviate flow behind the insert ring even more effectively.

Figure 5:
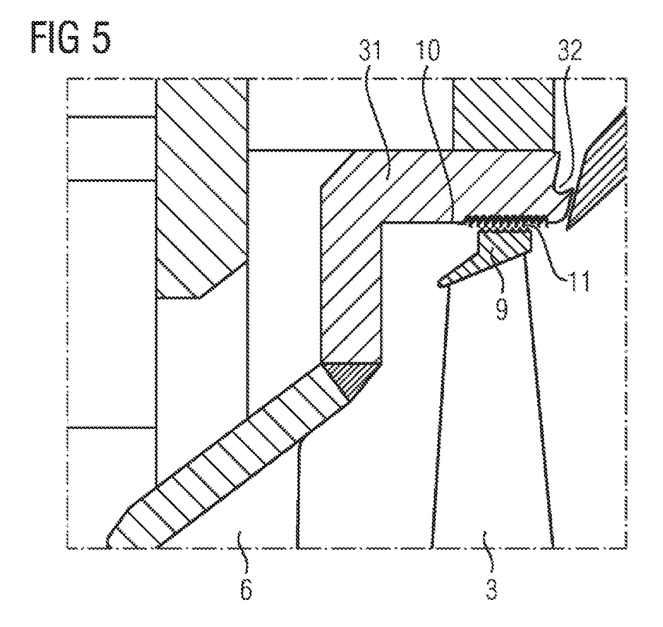
FIG. 5 shows a schematic axial part section through the low-pressure stage of a further steam turbine, in which the guide vanes are held on guide vane rings which are fastened on the casing.
Figure 6:
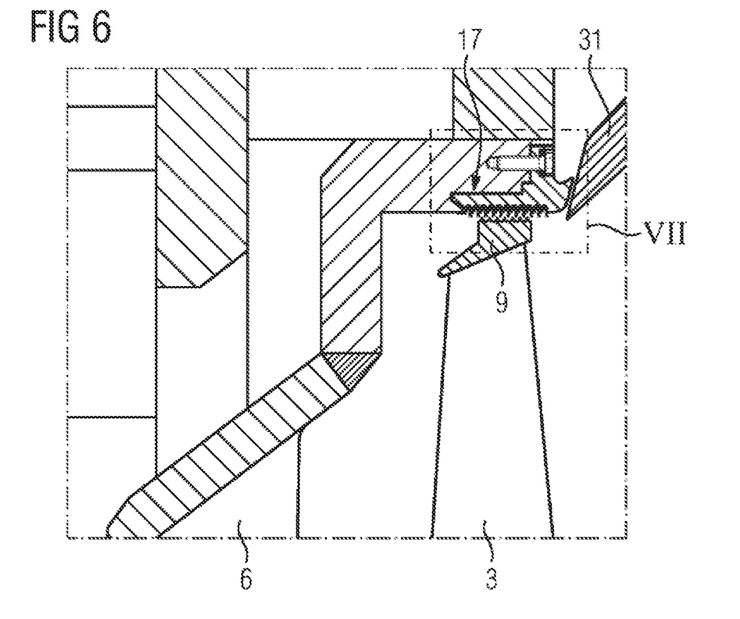
FIG. 6 shows the part section from FIG. 4, an insert ring according to a second embodiment being arranged radially opposite the tips of the rotor blade stage shown.
Figure 7:
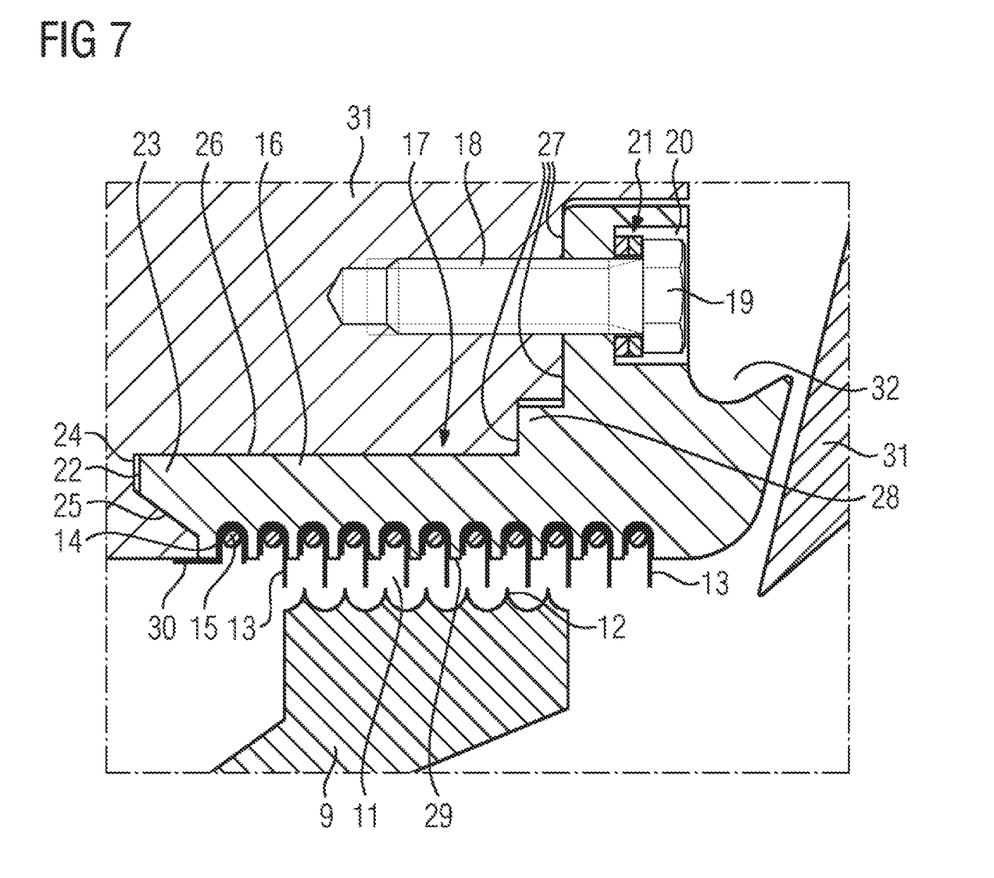
FIG. 7 shows an enlarged view in section of the insert ring from FIG. 5.

FIGS. 5 to 7 show schematic views in axial part section of a further steam turbine in which an annular gap 11 of a rotor blade stage has been refurbished by performing the above described embodiment of the method according to embodiments of the invention. Identical components are provided with identical reference numerals.

The difference between the steam turbine shown in FIGS. 1 to 4 and the one in these Figures consists mainly in that their rotor blades 6 are not held directly on the casing 1 and instead on guide vane rings 31 which are fastened by means of further components, i.e. indirectly, on the casing 1. The depression is accordingly here not produced in the casing 1 but instead in a guide vane ring 31.

Another difference is that an insert ring 17 with an alternative structure has been used which is provided with a smaller number of sealing strips 13 and has a circumferentially extending drainage channel 32 at its front side which faces right in the drawings. The drainage channel 32 is provided because that portion of the guide vane ring 31 which has been removed to produce the depression 16, as is clear from FIG. 5, likewise has a drainage channel 32 which needs to be replaced. Condensed steam which occurs in the transition region between two adjacent guide vane rings 31 is collected in the drainage channel 32 and, owing to the force of gravity, is guided to a central point below the rotor 2.

As can be seen in particular in FIG. 7, the end region of the adjacent guide vane ring 31 is in the way. The adjacent guide vane ring 31 has therefore been temporarily disassembled in order to perform the method according to embodiments of the invention, in particular the production of the depression 16 and the threaded bores 18 and the axial insertion of the insert ring 17, and reinserted after the completion of the method.

Figure 8:
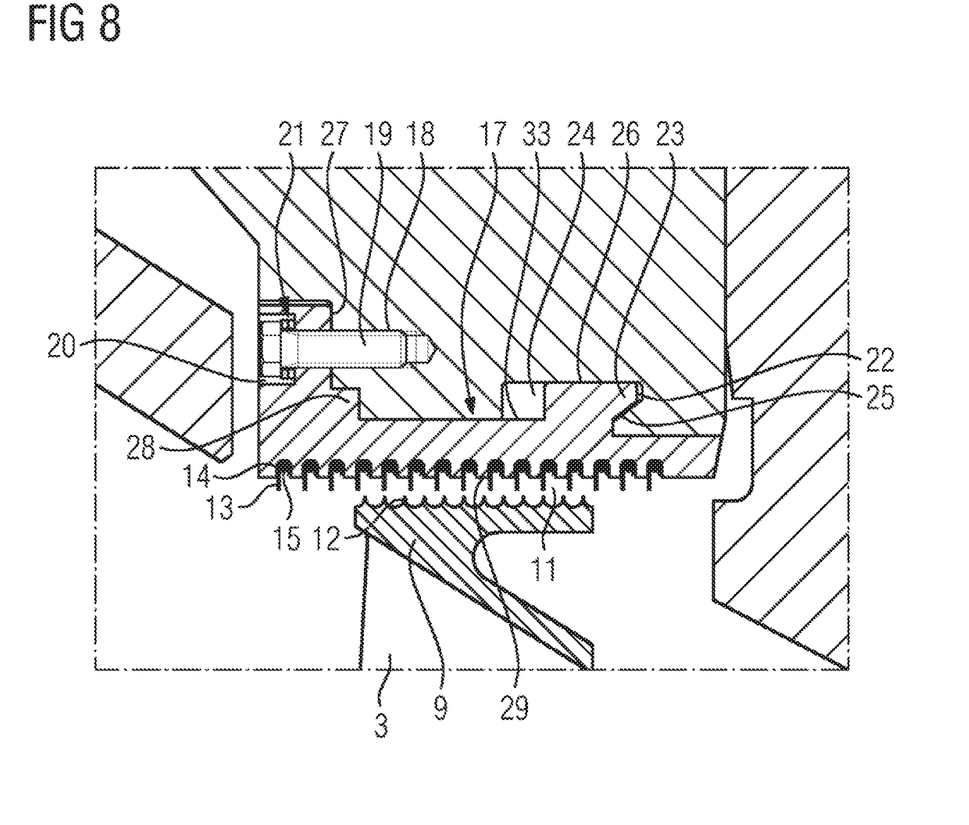
FIG. 8 shows an enlarged axial view in section of a third embodiment of an insert ring which is arranged in a further steam turbine radially opposite the tips of the rotor blade stage shown.

FIG. 8 shows a schematic axial part section through a third gas turbine in which an annular gap 11 of a rotor blade stage has been refurbished using the above described embodiment of the method according to embodiments of the invention.

The depression 16 is situated here, as in the case of the steam turbine in FIGS. 1 to 4, directly in the casing 1. However, because, owing to the shape of the casing in the region situated opposite the rotor blade tips 9, the depression 16 produced is open toward both the right-hand and left-hand front side, no casing material would be available for an associated receiving portion 24 for the front-side conical sealing portion 23 if, in the case of the two above described insert rings 17 shown in FIGS. 3 and 4 and 6 and 7, it would form the right-hand axial end region of the insert ring 17. In the case of the insert ring 17 used here, the front-side conical sealing portion 23 is therefore integrally formed on the outer cylindrical surface 33 of the insert ring 17 and is offset axially inward, i.e. to the left in FIG. 8. Sufficient casing material is then available for its rim. The receiving portion 24, corresponding to the front-side conical sealing portion 23, of the depression 16 is provided at a corresponding point. Its axial extent exceeds that of the conical sealing portion 23 such that the sealing portion 23 is first inserted radially into that half of the receiving portion 24 situated to the left in FIG. 8, and the insert ring 17 can then be pushed axially to the right so that its proper position in the depression 16 can be assumed and screwed axially.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A turbine comprising:
a casing; and
a rotor arranged in the casing, mounted so that the rotor can rotate about a central longitudinal axis, and equipped with a plurality of rotor blade stages,
wherein a depression, coaxial with the rotor and situated opposite tips of rotor blades of a stage, is provided in the casing or in at least one element fastened to the casing,
wherein an insert ring is inserted into the depression with play,
wherein the insert ring is inserted into the depression in an at least partially axial direction,
wherein the insert ring is fixed with fastening elements such that an at least partially axially directed tensile force is applied by means of the fastening elements,
wherein the insert ring has a conical and annular sealing portion which tapers toward an axial end of the insert ring, and the depression comprises a receiving portion, wherein the receiving portion corresponds to the sealing portion of the insert ring and has an inner contour adapted to an outer contour of the sealing portion of the insert ring with play,
wherein the sealing portion of the insert ring and the receiving portion of the depression are axially distal to the fastening elements, and
wherein the sealing portion tapers as the sealing portion extends into the receiving portion.

2. A method for sealing an annular gap in a turbine, wherein the turbine has a casing and a rotor which is arranged in the casing, wherein the turbine is mounted so that it can rotate about its central longitudinal axis, and wherein the turbine is equipped with a plurality of rotor blade stages, the method comprising:
a) providing an annular depression, coaxial with the rotor and situated opposite the tips of the rotor blades of a stage, in the casing or in at least one element fastened to the casing,
b) providing an insert ring designed such that it is configured to be inserted positively into the depression with play,
c) inserting the insert ring into the depression by pushing the insert ring into the depression in an at least essentially axial direction, and
d) fixing the insert ring with fastening elements such that an at least essentially axially directed tensile force is applied by means of the fastening elements;
wherein the insert ring has a conical and annular sealing portion which tapers toward an axial end of the insert ring, and the depression comprises a receiving portion, wherein the receiving portion corresponds to the sealing portion of the insert ring and has an inner contour adapted to an outer contour of the sealing portion of the insert ring with play, wherein the sealing portion of the insert ring and the receiving portion of the depression are axially distal to the fastening elements, and wherein the sealing portion tapers as the sealing portion extends into the receiving portion.

3. The method as claimed in claim 2, wherein the insert ring is fixed by elongated fastening elements, wherein the elongated fastening elements are screws and/or threaded rods and/or bolts, which are inserted at least essentially axially into the insert ring.

4. The method as claimed in claim 3, wherein a plurality of at least essentially axially oriented through bores, spaced apart circumferentially, are provided for each elongated fastening element, and a plurality of at least essentially axially oriented threaded bores are provided which are arranged such that they are aligned with the through bores in the insert ring when the insert ring is inserted properly into the depression.

5. The method as claimed in claim 2, wherein the fastening elements are each secured with a locking means, wherein the locking means is at least one wedge lock washer.

6. The method as claimed in claim 2, wherein the sealing portion is spaced apart axially with respect to points at which the tensile force is introduced via the fastening elements.

7. The method as claimed in claim 2, wherein the insert ring has an elongated limb which extends at least essentially axially and a limb which extends at least essentially radially.

8. The method as claimed in claim 7, wherein the sealing portion is formed by the axial end region of the limb which extends at least essentially radially or is integrally formed with the limb, in particular with its outer cylindrical surface, which extends at least essentially radially.

9. The method as claimed claim 2, wherein the insert ring has, on its inner cylindrical surface facing the rotor blade tips in the assembled state, a plurality of sealing strips which project radially from the insert ring and/or extend in the circumferential direction of the insert ring.

10. The method as claimed in claim 2, wherein the insert ring is produced by a single-part insert ring blank being manufactured first and the single-part insert ring blank being split into at least two insert ring parts which are of the same size, forming at least one split joint.

11. The method as claimed in claim 10, wherein the diameter of the insert ring provided exceeds the diameter of the depression produced by a predetermined value.

12. The method as claimed in claim 2, wherein the at least one element fastened to the casing is a guide vane ring on which all the guide vanes of at least one guide vane stage of the turbine are fastened.

13. The method as claimed in claim 2, wherein the method is performed for repairing the turbine, and in step a) the depression in the casing or at least one element fastened to the casing is produced using a material-removing method, and the depression produced extends over a region in the casing or at least one element, fastened directly or indirectly on the casing, on which damage was present prior to the removal of material.

14. The method as claimed in claim 7, wherein through bores are provided in the limb which extends at least essentially radially, and extend in particular at least essentially parallel to the other limb.

15. The turbine as claimed in claim 1, wherein the insert ring is fixed by elongated fastening elements, wherein the elongated fastening elements are screws and/or threaded rods and/or bolts, which are inserted at least partially axially into the insert ring.

16. The turbine as claimed in claim 15, wherein the insert ring includes a plurality of at least partially axially oriented through bores, spaced apart circumferentially, and a plurality of at least partially axially oriented threaded bores are provided in the casing or in the at least one element fastened to the casing and are arranged such that the threaded bores are aligned with the through bores in the insert ring when the insert ring is inserted properly into the depression.

17. The turbine as claimed in claim 1, wherein the insert ring is configured such that the sealing portion is spaced apart axially with respect to those points at which the tensile force is introduced via the fastening elements.

18. The turbine as claimed in claim 1, wherein the insert ring has an elongated limb which extends substantially axially and a second limb which extends substantially radially.

19. The turbine as claimed in claim 1, wherein the insert ring has, on an inner cylindrical surface facing the rotor blade tips, a plurality of sealing strips which project radially from the insert ring and/or extend in a circumferential direction of the insert ring.

20. The turbine as claimed in claim 1, wherein the at least one element fastened to the casing is a guide vane ring on which all the guide vanes of at least one guide vane stage of the turbine are fastened.

* * * * *